United States Patent [19]

Allen

[11] 3,884,523

[45] May 20, 1975

[54] PROTECTIVE COVERING FOR A VEHICLE

[76] Inventor: Brian S. Allen, P.O. Box 611, Ironton, Ohio 45638

[22] Filed: Jan. 21, 1974

[21] Appl. No.: 434,971

[52] U.S. Cl. .................... 296/136; 135/7; 297/184; 150/52 K
[51] Int. Cl. .............................................. B60j 7/20
[58] Field of Search ........... 296/78 R, 78.1, 82, 136, 296/37 R; 297/184, 219, 218, 195; 150/52 K; 135/7; 280/289

[56] References Cited
UNITED STATES PATENTS

| 1,600,977 | 9/1926 | Dameron | 296/37 R |
| 1,719,055 | 7/1929 | Herzer | 135/1 A |
| 1,853,742 | 1/1932 | Owen et al. | 150/52 K |
| 3,316,012 | 4/1967 | Thier | 296/136 |
| 3,537,746 | 11/1970 | Peters | 296/78.1 |
| 3,779,597 | 12/1973 | Uchida | 296/37 R |

FOREIGN PATENTS OR APPLICATIONS

| 863,906 | 1/1953 | Germany | 297/219 |
| 90,191 | 12/1960 | Denmark | 150/52 K |

Primary Examiner—Albert J. Makay
Assistant Examiner—Gary Auton

[57] ABSTRACT

A protective covering for a vehicle of the motorcycle or motorbike type for protecting the vehicle from the elements when parked outside, the covering comprising a generally contoured cover of flexible material contained within a cover storage compartment in the vehicle seat and having a portion thereof permanently secured to the vehicle seat with the cover being readily withdrawn from a closable opening in the vehicle seat in a manner to completely overlie the vehicle to cover the same and protect the vehicle from the elements, the cover being readily foldable and collapsible into a compact package for reinsertion back into the vehicle seat storage compartment during times of usage of the vehicle such that the covering always remains fixedly attached to the vehicle seat and is readily adapted to be rapidly and conveniently spread over the entire vehicle whenever desired for protecting the vehicle.

3 Claims, 4 Drawing Figures

PATENTED MAY 20 1975

3,884,523

PROTECTIVE COVERING FOR A VEHICLE

BACKGROUND OF THE INVENTION

1. Field of the Invention

This invention relates generally to protective covers for vehicles and more particularly to a novel and improved protective covering for a motorcycle, motorbike, and the like where the cover always remains permanently affixed to the motorcycle seat so as to be always readily available in a manner to be spread over the entire motorcycle to protect the same from the elements.

2. Description of the Prior Art

It has been generally known in the prior art to provide covers for the covering of motorcycles and the like, such covers being generally illustrated by references to Peters U.S. Pat. No. 3,537,746; Michael U.S. Pat. No. 3,284,130; and Warner U.S. Pat. No. 3,659,872. However, as clearly seen from these references, such prior art covers require a multiplicity of separate arrangements which are secured together over or about the motorcycle through the use of suitable fasteners, such as clips, snaps, or the like, with it being required that an individual remove the cover from saddle bags or the like and then deploy the cover over the motorcycle to protect the same, and when the individual returns to the motorcycle it is necessary for the individual to unsnap and unfasten the cover and then fold the same for returning the cover to the saddle bags for storage.

Among the obvious problems of such prior art covers is the fact that they are totally apart from the motorcycle so as to be easily forgotten at home or other location so as to not always be with the motorcycle at all times when required. A further problem is that such covers are easily stolen since they are totally separate from the motorcycle. Still a further problem is that such covers must be contoured to fit the particular brand and manufacture of motorcycle involved so that it is normally required that the cover manufacturer make a series of covers of different sizes and configurations in order to fit the numerous types and sizes of motorcycles.

SUMMARY OF THE INVENTION

The present invention recognizes the deficiencies and disadvantages of presently available vehicle covers and provides a novel solution thereto in the form of a cover manufactured of flexible material which is readily foldable into a compact manner which is stored within a compartment in the seat of the motorcycle, a portion of the cover being permanently affixed to the motorcycle seat with the cover being readily withdrawn from the motorcycle seat in a manner to completely cover and protect the complete motorcycle in a rapid and expedient manner, and after such use the cover is readily folded back into a small package within the vehicle seat so as to form a permanent accessory for use with the motorcycle which is always attached permanently to the motorcycle seat.

It is a feature of the present invention to provide a cover adapted for the covering and protection of a motorcycle and the like and which may be deployed with a minimum amount of effort, and which may be restored with the same minimum amount of effort.

A further feature of the present invention provides a motorcycle cover which is readily adapted for use on various types of motorcycles without requiring any special skills or expertise for the installation thereof.

Still a further feature of the present invention provides a cover for the protection of a motorcycle which is easily accomodated in a seat mounted on the motorcycle and which is readily withdrawn from and restored into the seat for purposes of usage and storage thereof in a manner not messing or otherwise dirtying the clothes of the motorcycle rider while deploying or folding the same.

Yet still a further feature of the present invention provides a cover for the protecting of a parked motorcycle from the elements of the weather and wherein the cover may be manufactured and installed in its entirety as part of the original equipment of the motorcycle, or which may be readily attached to the motorcycle later as an accessory item on existing motorcycles with a minimum amount of work involved.

The provision of a protective covering for a vehicle, such as a motorcycle, as briefly outlined above and possessing the stated features and advantages, constitutes the principal features and advantages of the present invention. The provision of a protective covering for a vehicle which is relatively simple in its construction and which therefore may be readily manufactured at a relatively low cost; one which is possessed of few parts and which therefore is unlikely to get out of order; one which is rugged and durable in construction and which therefore may be guaranteed by the manufacturer to withstand rough usage; one which is easy to use and reliable and efficient in operation; one which is aesthetically pleasing and refined in appearance; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

Figure 1:
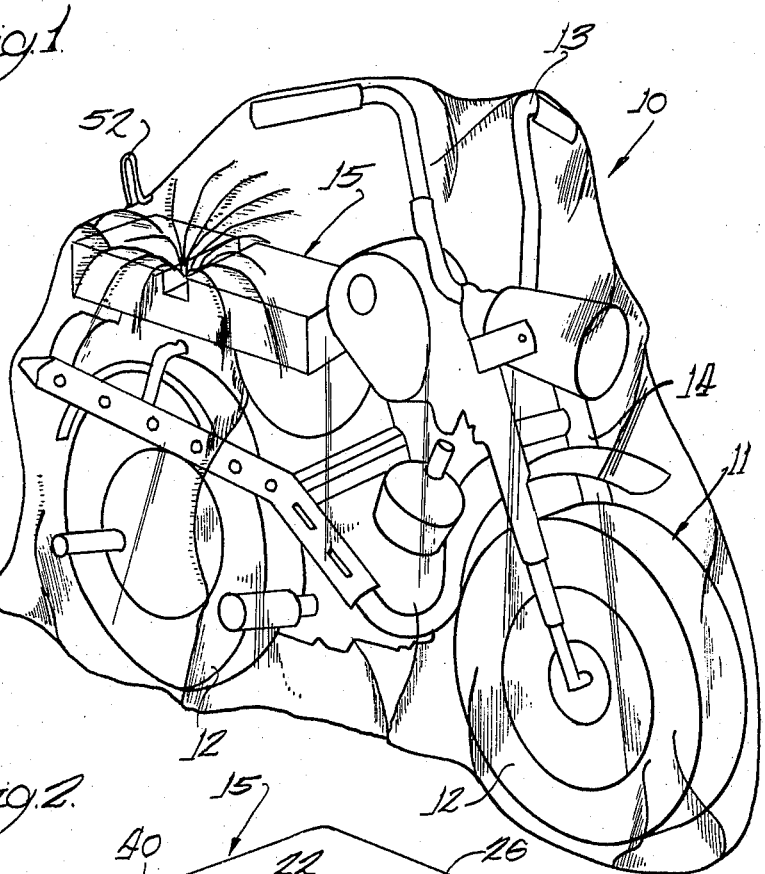
FIG. 1 is a perspective view of a motorcycle having the protective cover of the present invention mounted thereon.
Figure 2:
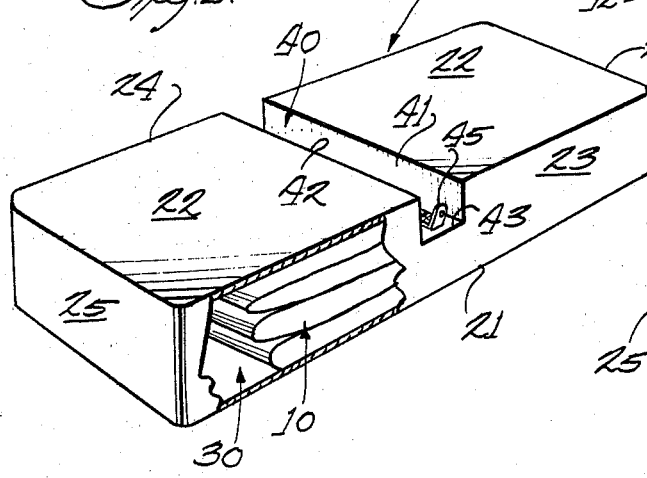
FIG. 2 is a perspective view of the motorcycle seat with a wall thereof partially broken away to illustrate the cover storage compartment therein.
Figure 3:
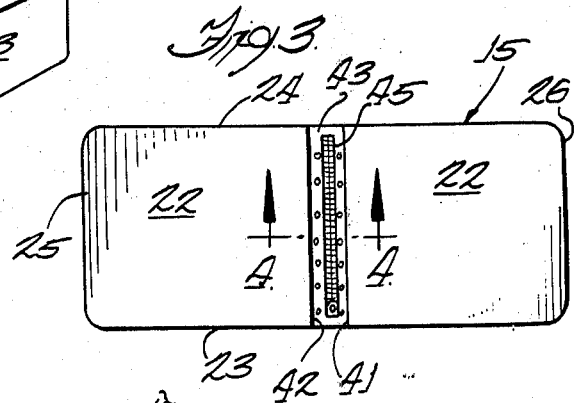
FIG. 3 is a top plan view of the motorcycle seat.

Referring now to the drawings in detail there is illustrated a preferred form of a protective cover for a vehicle which is constructed in accordance with the principles of the present invention and is designated generally in its entirety by the reference numeral 10 and is illustrated in its typical use on a two-wheeled motorcycle 11 having wheels 12, a pair of handle bars 13, a frame 14, and a seat 15 disposed in its conventional position on the frame 14.

The seat 15 is of an elongated hollow box-like rectangular configuration having a bottom surface 21, a top surface 22, side wall surfaces 23 and 24, and opposed end wall surfaces 25 and 26, the surfaces defining interiorly thereof a storage compartment 30 adapted to receive the cover 10 therein. Formed integrally in the seat 15 extending transversely through top surface 22 and inwardly of side wall surfaces 23 and 24 is a rectangular groove 40 having side walls 41 and 42 and a bottom surface 43, the surfaces being a continuation of top surface 22 so as to retain storage compartment 30 completely enclosed. The bottom surface 43 is provided with a zipper closure 45 extending axially therealong to provide selective access to the storage compartment 30.

Figure 4:
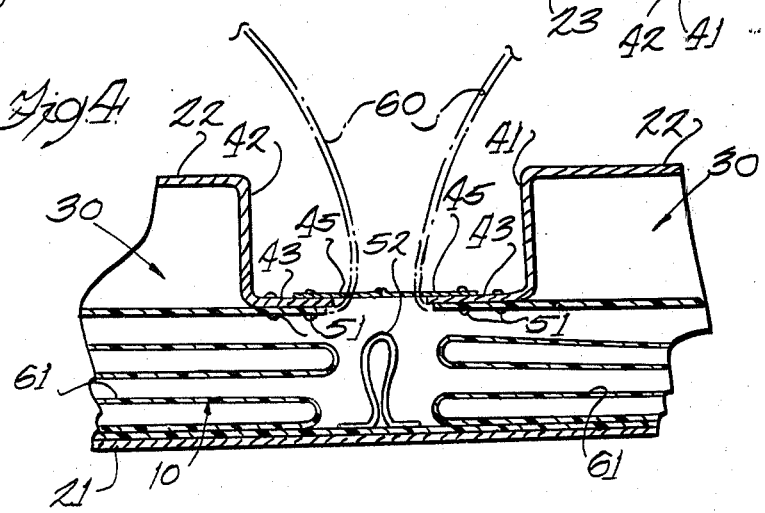
FIG. 4 is an enlarged cross-sectional view taken along Line 4—4 of FIG. 3.

Disposed within storage compartment 30 is the cover 10 which is manufactured of a flexible material, this being preferably a vinyl plastic ranging in thickness between five and six mils which may be transparent or provided in any number of opaque colors or designs to enhance the aesthetic appeal thereof. The peripheral edges of the cover 30 are secured by rivets 51 to the underneath portion of bottom surface 43, such as seen in FIG. 4, with the cover then being folded in overlying layers within storage compartment 30. A portion of the cover is provided with a pull tab 52 adapted to be disposed beneath zipper 45 when the cover is folded in the storage compartment 30 so that an individual upon opening zipper 45 may readily grasp the tab 52 in a manner to pull the cover outwardly of the zippered opening and deploy the cover in a protective manner completely covering the motorcycle, such as seen in FIG. 1, so that when the motorcycle is parked outside the cover will protect the same from the elements of the weather, such as rain, dew, or any other type of exposure which would otherwise be undesirable to the motorcycle both due to wear and tear thereon as well as providing possible discomfort to the motorcyclist who does not wish to return to the motorcycle and have to sit on a wet seat or, alternatively, have to find some means for appropriately drying the seat before sitting thereon, this being required for present motorcycles not provided with a cover of the present invention.

After use of the cover the motorcyclist readily folds the same in any convenient manner back into the storage compartment 30 so that the cover is always permanently affixed to the motorcycle and is readily deployed with a minimum of time and effort and in a manner convenient to the motorcyclist thus encouraging the constant use thereof.

It is to be noted from FIG. 4 that the cover provides a dual layer of protective sheeting over the motorcycle, the first layer which would lie directly over the motorcycle being generally designated by reference numeral 60 with the second layer being generally designated by reference numeral 61 and which would overlie the first layer thus providing a complete cover for the motorcycle seat as well as a double wear cover for the protection of the complete motorcycle.

It is to be understood that the motorcycle seat 15 includes the conventional mounting brackets and the like required for mounting the seat to the motorcycle which, since such brackets and mounting paraphenelia do not form a part of the present invention, are not described herein.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A protective covering for a motorcycle vehicle comprising:

a seat adapted to be mounted in the conventional position on the motorcycle;

a hollow storage compartment defined within said seat;

means providing access to said storage compartment for selectively opening and closing the same, said seat being defined by an elongated hollow, box-like rectangular configuration having a top surface, a bottom surface, opposed sidewall and endwall surfaces, said surfaces defining the storage compartment, said means providing access to said storage compartment and comprising a slot extending transversely through said top surface;

a flexible sheet member having a portion of its peripheral edge permanently affixed to said seat inwardly of said compartment, said sheet member adapted to be partially withdrawn from said compartment in a manner to completely cover said motorcycle to protect the motorcycle, said sheet being readily collapsible and adapted to be folded into said storage compartment for storage therein between use, the peripheral edges of said sheet material being permanently affixed to said seat inwardly of said storage compartment about said access slot, said access slot being recessed inwardly of said seat top surface with the means closing said access slot being in the form of an elongated closure member affixed to the opposite sides of said slot and operable in a manner to open and close said slot and wherein said means affixed to said sheet of material for assistance in deploying the same comprises a handle-shaped pull tab affixed to said sheet of material and adapted to be disposed inwardly of said storage compartment once said cover is folded thereinto whereby upon opening said closure member the user may readily grasp the pull tab to withdraw said sheet of material through said slot in a manner to deploy the same over said motorcycle.

2. The cover as set forth in claim 1 wherein said sheet of material provides a dual layer of protection over said motorcycle, said first layer being in contact with said motorcycle and said second layer overlying said first layer and being isolated from contact with said motorcycle.

3. The protective cover as set forth in claim 2 wherein said sheet of material is manufactured of a vinyl plastic having a thickness within the range of 5 to about 6 mils.

* * * * *